Apr. 17, 1923.
W. C. BAER
1,452,138
LAMP BRACKET
Filed Sept. 27, 1920
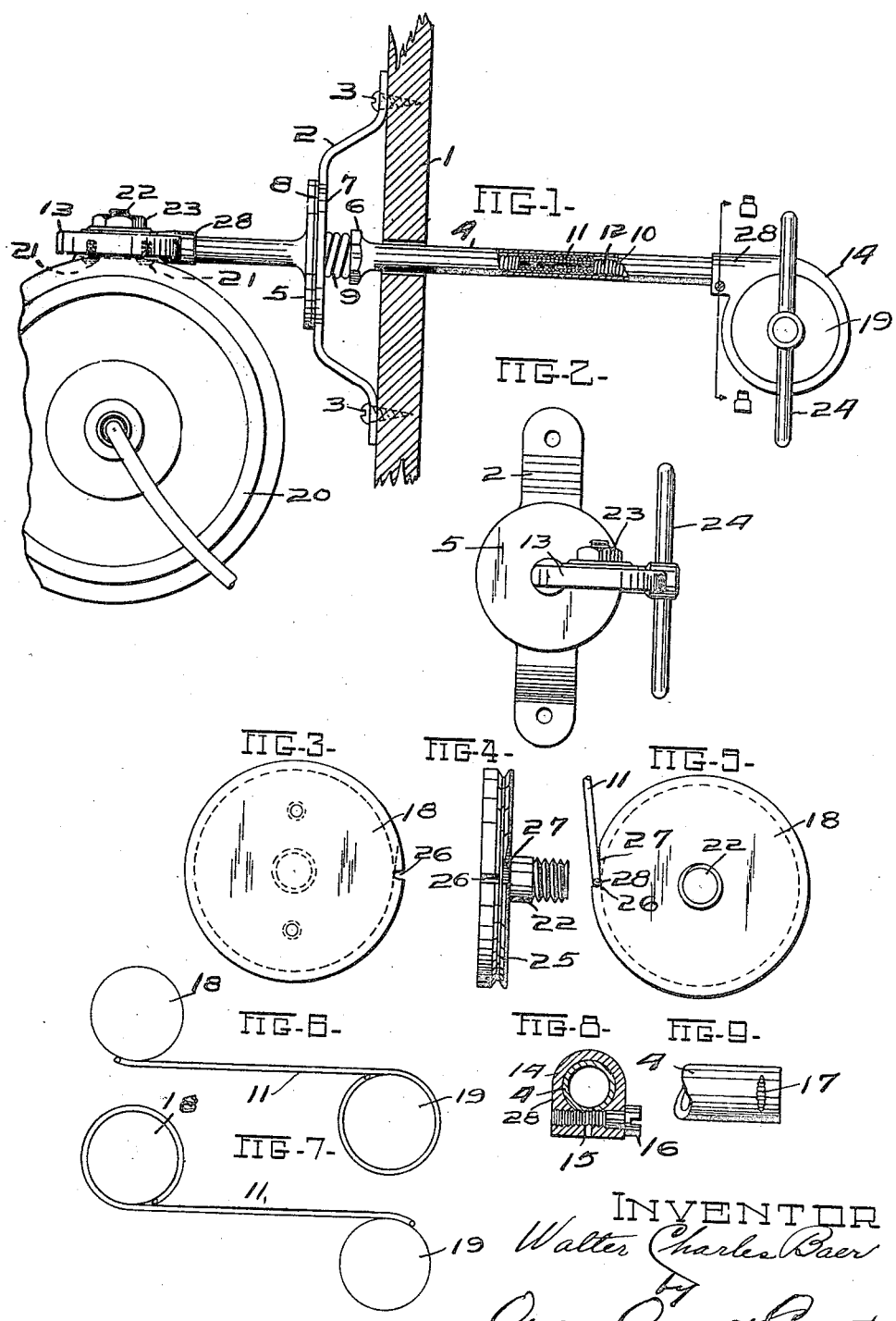

Patented Apr. 17, 1923.

1,452,138

UNITED STATES PATENT OFFICE.

WALTER CHARLES BAER, OF TOLEDO, OHIO.

LAMP BRACKET.

Application filed September 27, 1920. Serial No. 413,212.

*To all whom it may concern:*

Be it known that I, WALTER CHARLES BAER, a citizen of the United States, and a resident of Toledo, in the county of Lucas and State of Ohio, have made an invention appertaining to Lamp Brackets; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a bracket for the purpose of readily directing the light of a focusing lamp in different directions. It particularly has for its object to provide a bracket for a "spot light" commonly used in connection with automobiles, whereby the rays of light may be directed in different directions by a means that may be readily manipulated. The invention is particularly advantageous when used in a bracket for supporting a spot light attached to a closed car, such as a coupé or limousine, or when the side curtains of a car having a top are down.

The invention also has for its object to provide in connection with such a bracket a simple and efficient means whereby the bracket will be easily constructed and at a low cost and yet which will be efficient and easily manipulated. Other features and advantages will appear from the following description and upon examination of the drawings.

The invention may be contained in brackets of different forms and for purposes of illustration I have selected a bracket containing the invention and will describe it hereinafter. The bracket selected as an example is illustrated in the drawings.

Figure 1 of the drawings illustrates a side view of the bracket showing a supporting part of an automobile in section. Fig. 2 is an end view of the bracket, shown in Fig. 1, having the lamp detached. Fig. 3 is a top view of one of the rotative discs used in the bracket. Fig. 4 is a sectional view of the disc illustrated in Fig. 3. Fig. 5 is a view of the opposite side of the disc to that shown in Fig. 3. Figs. 6 and 7 illustrate diagrammatically the different positions of the two discs used for rotation of the lamp. Fig. 8 illustrates the means for interlocking one of the shells with the supporting tubular member. Fig. 9 is a side view of a portion of the end of the tubular member.

1 in Fig. 1 indicates a part of the supporting structure such as the rib of a top or an upright in a limousine or other closed car. To the part 1 of the car is secured a U-strap member 2 by any suitable means such as by the screws 3. A tubular member 4 formed of two parts threaded or welded together as may be desired to form a unitary member has a flange 5 and a shoulder 6 located on opposite sides of the supporting strap 2. The flange 5 is disc shape and the U-member 2 may be provided with a disc-shaped flange 7 having a size substantially the same as that of the disc 5. Between the two disc shaped flanges 5 and 7 may be located a fibre disc 8. A spring 9 is located between the shoulder 6 and the U-member 2, whereby the shoulder 6 will pull the disc-shaped flange 5 towards the disc-shaped flange 7 and thus the disc 8 of fiber will be frictionally engaged by the discs and rotation of the tubular member 4 will be resisted to the extent of the frictional engagement between the parts.

Within the tubular member 4 is located a flexible connector 10 of a form well known in the art having a steel connecting wire 11 surrounded by a spirally formed shell 12 that confines the wire 11 and hence the wire 11 may be moved against considerable resistance by pushing the wire as well as by pulling the wire. A pair of shells 13 and 14 are located at opposite ends of the tubular member 4. The shell 13 may be threaded on to the end of the tubular member and securely fastened in any way to prevent rotation of the shell 13 relative to the tubular member 4. The shell 14 is slipped upon the end of the tubular member 4. The shell is split at 15 as indicated in Fig. 8 and a screw 16 operates to clamp the shell on to the end of the tubular member 4. Also the hole formed in the shell to receive the screw 16 is so located that its surface intersects the surface of the tubular member 4 and when the hole is tapped a portion of the tubular member is also tapped as shown at 17 in Fig. 9.

When, therefore, the screw 16 is inserted it engages the thread forming the end of the tubular member as well as the thread in the shell and thus rotation of the shell 14 with respect to the tubular member 4 is prevented at the same time the screw 16 operates to clamp the shell to the tubular member. Each shell 14 is provided with a recess in which is located the discs 18 and 19. The lamp 20 is secured to the disc 18 by means of screws 21 or by any other suitable means and the disc 18 is connected to the shell 13 by means of the stud 22. The stud 22 is threaded on a reduced portion thereof and the disc is secured in the shell 13 for rotation by means of the nut 23 which is threaded on to the stud 22.

The disc 19 is provided with a handle 24 and is secured in position in the shell 14 in the same manner that the disc 18 is secured in the shell 13. Each disc is provided with a groove 25 in which the wire 11 may be located. Also each of the discs 18 and 19 is provided with a cross-channel 26 and the ends of the wire 11 are turned at right angles and placed in the cross-channel 26, while the body of the wire is placed in the groove 25. One or both of the discs may also be provided with a notch 27 which extends substantially tangential to the bottom of the groove 25 and is formed on that portion or portions of one or both of the discs located on that side of the groove which first enters the shell when the disc is placed in the shell, that is, it is located on that side of the groove on which the stud 22 is located.

In assembling the bracket and particularly in placing the discs in position, the wire 11 is inserted through the tubular member 4 and the shell 13 is secured in position on the end of the tubular member. The end of the wire located in the end of the shell 13 is then bent at right angles to the body portion of the wire and placed in the cross groove 26. The disc 18 is then placed in the shell 13, the body portion of the wire near the end thereof slipping through the notch 27 until it lies within the groove 25 whereupon the disc 18 is turned so as to draw the end of the wire located in the shell 14 to near the end of the tubular member 4. The disc 19 is then placed in the shell 14, the turned end of the wire 11 located in the shell 14 being inserted in the cross groove 26 and placed in the groove 25 of the disc 19 by being pushed through the notch 27 as the disc 19 is moved into the shell 14. The nuts 23 are then placed upon the studs 22 of the disc and the discs are secured for rotative purposes within the shells. The rotation of one of the discs in either direction will cause a similar rotation of the other disc, the wire 11 operating the other disc by being either pulled or pushed.

The wire 11 is made preferably a little longer than the distance between the two cross-channels 26 of the discs 18 and 19 when the channels 26 are placed above the centers of the discs, that is, the wire is a little longer than the distance between the two centers of the discs if the shells 13 and 14 are placed in the same plane. This relation of the wire to the disc is illustrated, though somewhat exaggerated, in the diagrammatic Figures 6 and 7. The wire 11 is preferably made about one-fourth inch longer than the distance between the centers of the discs if the shells and discs were placed in the same plane and yet at the same time placed on the ends of the tubular member 4.

The purpose of making the wire a little longer than the distance between the centers of the discs after they were so positioned is to prevent the escape of the wire from the grooves 25 for if the wire were not a little longer than the distance mentioned, when one of the discs had been turned so as to bring the end of the wire into the portion of the shell 14 that leads to the tubular member 4 it would spring out of the cross-channel 26 and out of the groove 25. This clearly would be the case if the wire 11 was made a trifle shorter than the distance between the centers of the discs when positioned in the same plane. By making the wire 11 a little longer than the distance mentioned either end of the wire when it comes to that portion of a shell near the tubular member 4 it will be held in the groove 25 and the channel 26 by the wall of one or the other of the shells 13 or 14, while on the other hand when the wire is wound completely around one of the discs, the other end of the wire will be secured by the body portion of the wire although the end may enter the boss 28 of that shell. This will hold that end in position in the cross-channel 26 and the end of the body portion of the wire in the groove 25.

I claim:—

1. In an adjustable bracket, a supporting member, a pair of shells connected to the supporting member, a pair of discs in the shells, a wire interconnecting the discs and having turned ends, the discs having grooves for receiving the wire, and notches for permitting the wire to enter the grooves when the discs are inserted in the shells.

2. In an adjustable bracket a rotatable supporting member, a pair of rotative members supported by the first named member and in tangential relation to the axis of the supporting member, a flexible wire extending through and in tangential relation to and confined by the first named rotatable member, and located substantially in the axis of rotation of the first named rotatable member and interconnecting the last mentioned rotative members to produce rotation of one of the last named rotative members by the endwise pressure or pull of the wire produced by the rotation of the other of the last named rotative members.

3. In an adjustable bracket a supporting member, a pair of shells, a pair of discs having grooves and notches and located in the shells, a wire interconnecting the discs and confined by the supporting member, the shells and the grooves and notches of the discs, the length of the wire being longer than the distance between the centers of the discs when the discs are located in substantially the same plane, and shorter than the distance between the centers of the discs plus the periphery of the smaller disc to prevent escape of the wire from the notches and the grooves of the discs.

4. In an adjustable bracket, a rotatable supporting member, a pair of rotative members supported by the first named member and in tangential relation to the axis of the supporting member, a flexible member extending through and in tangential relation to and confined by the first named rotatable member and located substantially in the axis of rotation of the first named rotatable member, and interconnecting the last mentioned rotative members to produce rotation of one of the last mentioned rotative members by the endwise pressure or pull of the flexible member produced by the rotation of the other of the last named rotative members.

In testimony whereof I have hereunto signed my name to this specification.

WALTER CHARLES BAER.